(12) United States Patent
Jang et al.

(10) Patent No.: US 11,174,340 B2
(45) Date of Patent: Nov. 16, 2021

(54) WINDOW FILM COMPOSITION, FLEXIBLE WINDOW FILM FORMED THEREFROM AND FLEXIBLE DISPLAY DEVICE CONTAINING SAME

(71) Applicant: SOLIP TECH CO., LTD., Daejeon (KR)

(72) Inventors: Seung Woo Jang, Suwon-si (KR); Kyoung Ku Kang, Suwon-si (KR); Min Hye Kim, Suwon-si (KR); Ji Hwan Park, Suwon-si (KR); Chang Soo Woo, Suwon-si (KR); Ji Sun Im, Suwon-si (KR); Dong Il Han, Suwon-si (KR)

(73) Assignee: SOLIP TECH CO., LTD., Daejeon (KR)

( * ) Notice: Subject to any disclaimer, the term of this patent is extended or adjusted under 35 U.S.C. 154(b) by 80 days.

(21) Appl. No.: 15/747,085

(22) PCT Filed: Jul. 22, 2016

(86) PCT No.: PCT/KR2016/008014
§ 371 (c)(1),
(2) Date: Jan. 23, 2018

(87) PCT Pub. No.: WO2017/018734
PCT Pub. Date: Feb. 2, 2017

(65) Prior Publication Data
US 2018/0371189 A1    Dec. 27, 2018

(30) Foreign Application Priority Data

Jul. 29, 2015   (KR) .................. 10-2015-0107574

(51) Int. Cl.
*B32B 27/30*       (2006.01)
*C08G 59/42*       (2006.01)
(Continued)

(52) U.S. Cl.
CPC ............ *C08G 59/24* (2013.01); *B32B 27/306* (2013.01); *C08G 59/3281* (2013.01);
(Continued)

(58) Field of Classification Search
CPC .. C09D 183/06; C09D 163/00; C08K 5/1515; C08K 5/56; C08G 59/24; C08G 59/3281;
(Continued)

(56) References Cited

U.S. PATENT DOCUMENTS

| | | | |
|---|---|---|---|
| 2013/0203882 A1* | 8/2013 | Cherkaoui | C08L 83/06 522/31 |
| 2015/0093585 A1* | 4/2015 | Bae | C09D 183/06 428/447 |
| 2016/0237312 A1* | 8/2016 | Treadway | C09D 183/06 |

FOREIGN PATENT DOCUMENTS

| | | |
|---|---|---|
| CN | 101638519 A | 2/2010 |
| CN | 102604651 A | 7/2012 |

(Continued)

OTHER PUBLICATIONS

Sigma-Aldrich Bisphenol A diglycidyl ether www.sigmaaldrich.com Accessed Jun. 17, 2019.*

(Continued)

*Primary Examiner* — Alicia J Sawdon
(74) *Attorney, Agent, or Firm* — Osha Bergman Watanabe & Burton LLP

(57) ABSTRACT

Provided are a window film composition, a flexible window film formed therefrom and a flexible display device containing the same, the composition comprising: a crosslinking agent represented by RX-X—Z—Y-RY (RX and RY each independently represent a glycidyl group, a glycidyl group-containing functional group, an alicyclic epoxy group or an alicyclic epoxy group-containing functional group); an epoxy group-containing siloxane resin; and an initiator.

9 Claims, 2 Drawing Sheets

(51) Int. Cl.

| | |
|---|---|
| *C08G 77/14* | (2006.01) |
| *C08K 5/56* | (2006.01) |
| *C09D 183/06* | (2006.01) |
| *C08G 59/24* | (2006.01) |
| *C09J 7/29* | (2018.01) |
| *C09D 163/00* | (2006.01) |
| *C08L 83/04* | (2006.01) |
| *G06F 3/041* | (2006.01) |
| *C08G 59/68* | (2006.01) |
| *C08G 77/18* | (2006.01) |
| *C08G 59/32* | (2006.01) |
| *C08J 7/04* | (2020.01) |
| *C08J 7/043* | (2020.01) |
| *C08J 7/046* | (2020.01) |
| *C08J 5/18* | (2006.01) |
| *C08L 101/02* | (2006.01) |
| *G06F 3/044* | (2006.01) |

(52) U.S. Cl.
CPC ........... *C08G 59/42* (2013.01); *C08G 59/688* (2013.01); *C08G 77/14* (2013.01); *C08G 77/18* (2013.01); *C08J 5/18* (2013.01); *C08J 7/043* (2020.01); *C08J 7/046* (2020.01); *C08J 7/0427* (2020.01); *C08K 5/56* (2013.01); *C08L 83/04* (2013.01); *C08L 101/02* (2013.01); *C09D 163/00* (2013.01); *C09D 183/06* (2013.01); *C09J 7/29* (2018.01); *G06F 3/0412* (2013.01); *C08J 2367/02* (2013.01); *C08J 2463/00* (2013.01); *C08J 2483/06* (2013.01); *C09J 2203/318* (2013.01); *C09J 2301/122* (2020.08); *C09J 2483/006* (2013.01); *G06F 3/044* (2013.01); *G06F 2203/04103* (2013.01)

(58) Field of Classification Search
CPC ...... C08G 59/42; C08G 59/688; C08G 77/14; C08G 77/18; C08L 101/02; C08L 83/04
See application file for complete search history.

(56) References Cited

FOREIGN PATENT DOCUMENTS

| | | | |
|---|---|---|---|
| JP | 2007-176542 A | | 7/2007 |
| KR | 10-2012-0079804 A | | 7/2012 |
| KR | 20120079804 A | * | 7/2012 |
| KR | 10-2014-0004568 A | | 1/2014 |
| KR | 10-2014-0039857 A | | 4/2014 |
| KR | 10-2016-0066679 A | | 6/2016 |
| WO | WO 2013/111735 A1 | | 8/2013 |
| WO | WO 2014/186514 A1 | | 11/2014 |

OTHER PUBLICATIONS

Office Action in corresponding Korean Patent Application No. 10-2015-0107574, Korean Office action dated Feb. 27, 2018 (8 pgs.).
International Search Report for corresponding International application No. PCT/KR2016/008014, dated Oct. 20, 2016, including Eng. trans. 6pp.
Written Opinion for corresponding International application No. PCT/KR2016/008014, dated Oct. 20, 2016, 6pp.
Sun et al. "Study on Cationic Photopolymerization Reaction of Epoxy Polysiloxane,", Nuclear Instruments and Methods in Physics Research B 264, 318-322, Sep. 20, 2007.
China Office Action in corresponding Chinese Application No. 201680043766.5, Chinese Office action dated Nov. 30, 2018 (8 pgs.).

* cited by examiner

[FIG. 1]
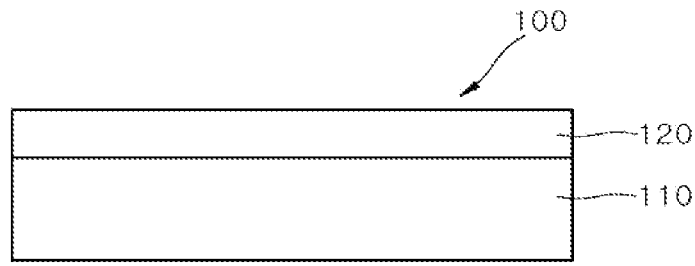
[FIG. 2]
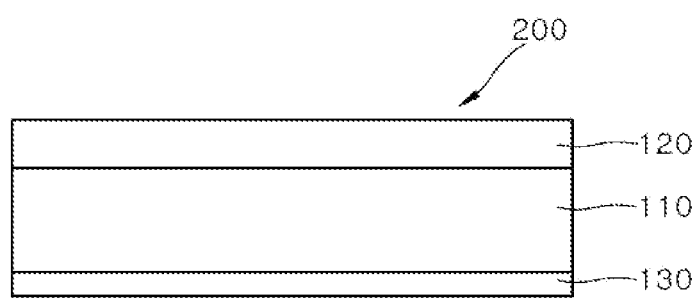
[FIG. 3]
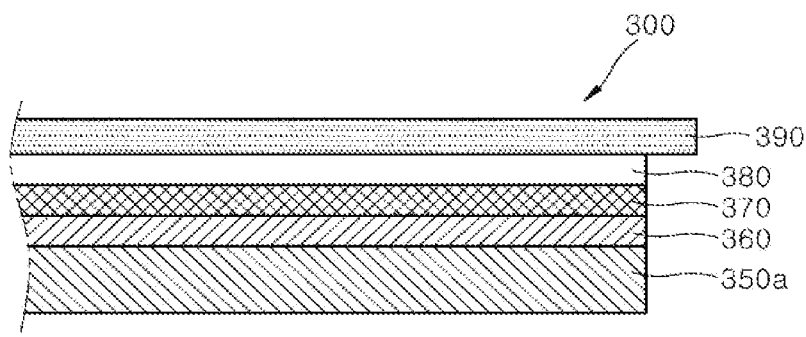
[FIG. 4]
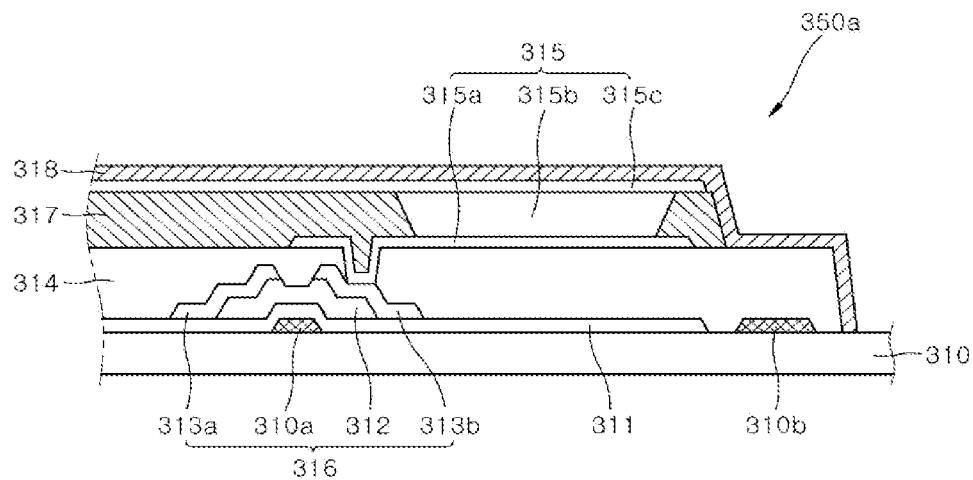

【FIG. 5】
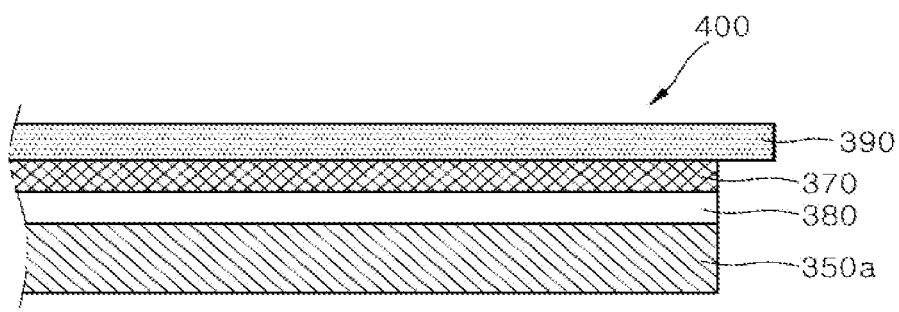
【FIG. 6】
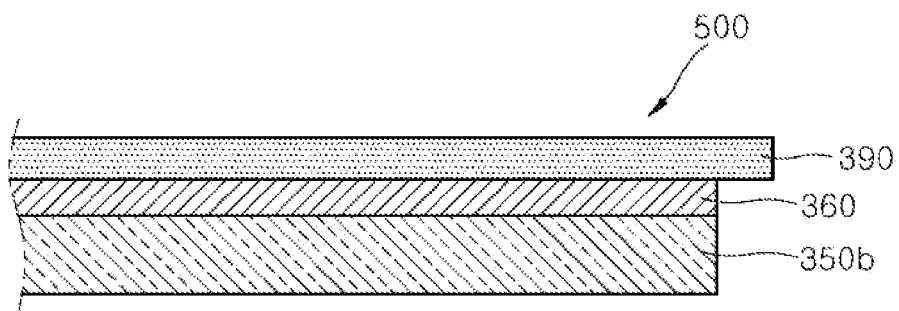
【FIG. 7】
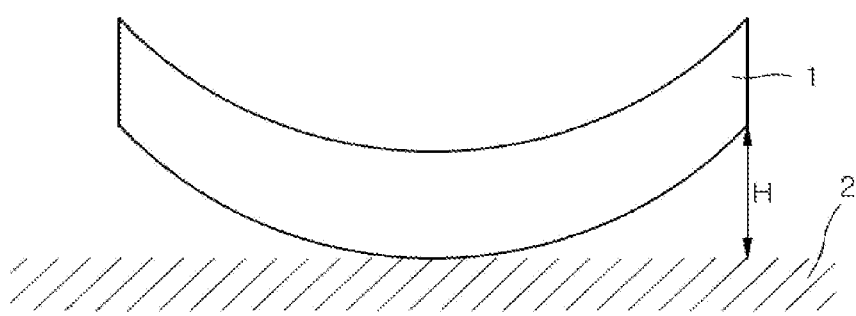

WINDOW FILM COMPOSITION, FLEXIBLE WINDOW FILM FORMED THEREFROM AND FLEXIBLE DISPLAY DEVICE CONTAINING SAME

CROSS-REFERENCE TO RELATED APPLICATIONS

This Application is a National Phase Patent Applications and claims priority to and the benefit of International Application Number PCT/KR2016/008014, filed on Jul. 22, 2016, which claims priority to and the benefit of Korean Patent Application No. 10-2015-0107574, filed on Jul. 29, 2015, the entire contents of each of which are incorporated herein by reference.

BACKGROUND

1. Field

The present invention relates to a composition for window films, a flexible window film formed therefrom, and a flexible display comprising the same.

2. Description of the Related Art

Recently, with the replacement of a glass substrate or a high hardness substrate with a film in a display, a flexible display capable of being folded or unfolded has been developed in the related art. The flexible display is thin and light, has high impact resistance, can be folded and unfolded, and thus can be manufactured in various shapes.

In such a flexible display, not only a substrate but also various elements are required to have flexibility. Particularly, since a window film is disposed at the outermost side of the display, it is necessary for the window film to have flexibility and high hardness. Further, since the window film is manufactured by curing a composition for window films coated on a base layer, the window film can suffer from curling.

The background technique of the present invention is disclosed in Japanese Unexamined Patent Publication No. 2007-176542.

SUMMARY

It is one aspect of the present invention to provide a composition for window films that can realize a flexible window film having high hardness and good flexibility.

It is another aspect of the present invention to provide a composition for window films that can realize a flexible window film capable of suppressing curling.

It is a further aspect of the present invention to provide a flexible window film that has high hardness and good flexibility and is capable of suppressing curling.

It is yet another aspect of the present invention to provide a flexible display including the flexible window film as set forth above.

In accordance with one aspect of the present invention, a composition for window films includes: a crosslinking agent represented by Formula 1; an epoxy group-containing siloxane resin; and an initiator:

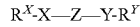

<Formula 1>

(where in Formula 1, $R^X$, $R^Y$, X, Y, and Z are the same as defined in the following detailed description of the invention).

In accordance with another aspect of the present invention, a flexible window film includes: a base layer; and a coating layer formed on the base layer, wherein the coating layer is formed of the composition for window films as set forth above.

In accordance with a further aspect of the present invention, a flexible display includes the flexible window film as set forth above.

The present invention provides a composition for window films that can realize a flexible window film having high hardness and good flexibility.

The present invention provides a composition for window films that can realize a flexible window film capable of suppressing curling.

The present invention provides a flexible window film that has high hardness and good flexibility and is capable of suppressing curling.

The present invention provides a flexible display including the flexible window film as set forth above.

BRIEF DESCRIPTION OF THE DRAWINGS

FIG. 1 is a sectional view of a flexible window film according to one embodiment of the present invention.

FIG. 2 is a sectional view of a flexible window film according to another embodiment of the present invention.

FIG. 3 is a sectional view of a flexible display according to one embodiment of the present invention.

FIG. 4 is a sectional view of one embodiment of a display part shown in FIG. 3.

FIG. 5 is a sectional view of a flexible display according to another embodiment of the present invention.

FIG. 6 is a sectional view of a flexible display according to a further embodiment of the present invention.

FIG. 7 is a diagram illustrating a method of measuring curl.

DETAILED DESCRIPTION

Embodiments of the present invention will be described in detail with reference to the accompanying drawings. It should be understood that the present invention is not limited to the following embodiments and may be embodied in different ways. In the drawings, portions irrelevant to the description will be omitted for clarity. Like components will be denoted by like reference numerals throughout the specification.

Herein, spatially relative terms such as "upper" and "lower" are defined with reference to the drawings. Thus, it will be understood that the term "upper surface" can be used interchangeably with the term "lower surface". In addition, when an element such as a layer or a film is referred to as being placed "on" another element, it can be directly placed on the other element or intervening element(s) may be present. On the other hand, when an element is referred to as being placed "directly on" another element, there are no intervening element(s) therebetween.

Herein, "pencil hardness" is measured on a coating layer of a window film using a pencil hardness tester (Heidon) in accordance with JIS K5400. In measurement of pencil hardness, pencils of 6B to 9H (Mitsubishi Co., Ltd.) are used. Specifically, pencil hardness is measured under conditions of a pencil load of 1 kg on the coating layer, a scratch angle of 45°, and a scratch speed of 60 mm/min. When the coating layer has one or more scratches after being tested 5 times using a certain pencil, pencil hardness is measured again using another pencil having one-level lower pencil hardness than the previous pencil, and the maximum value of pencil hardness allowing no scratch to be observed all five times on the coating layer is taken as pencil hardness of the coating layer.

Herein, "radius of curvature" means a minimum radius of a jig causing no cracks on a window film specimen when the window film specimen is wound around the jig for measuring radius of curvature (CFT-200R, Covotech Co., Ltd.), kept wound for 5 seconds, unwound, and then observed with the naked eye to determine whether the specimen has cracks. Here, a radius of curvature in a compression direction is measured when the specimen is wound around the jig such that a window coating layer of the window film contacts a surface of the jig, and a radius of curvature in a tensile direction is measured when the specimen is wound around the jig such that a base layer of the window film contacts the jig.

Herein, referring to FIG. 7, "curl" means an average height H from a floor 2 to each of four edges of a rectangular window film 1, which is placed on the floor 2 such that a coating layer of the window film faces upwards, as measured after the window film 1 is left under conditions of 25° C. and 40% relative humidity (RH).

Herein, the term "(meth)acryl" refers to "acryl" and/or "methacryl".

Herein, the term "epoxy group" in "epoxy group-containing siloxane resin" and "$R^1$ to $R^7$" mean an alicyclic epoxy group, a glycidyl group, an alicyclic epoxy group-containing functional group, or a glycidyl group-containing functional group.

Herein, the term "alicyclic epoxy group" means an epoxidized $C_5$ to $C_{20}$ cycloalkyl group.

Herein, the term "alicyclic epoxy group-containing functional group" means an alicyclic epoxy group-containing substituted or unsubstituted $C_1$ to $C_{20}$ alkyl group, substituted or unsubstituted $C_5$ to $C_{20}$ cycloalkyl group, or substituted or unsubstituted $C_6$ to $C_{20}$ aryl group.

Herein, the term "glycidyl group-containing functional group" means a glycidoxy group, glycidyl group or glycidoxy group-containing substituted or unsubstituted $C_1$ to $C_{20}$ alkyl group, a glycidyl group or glycidoxy group-containing substituted or unsubstituted $C_5$ to $C_{20}$ cycloalkyl group, or a glycidyl group or glycidoxy group-containing substituted or unsubstituted $C_6$ to $C_{20}$ aryl group.

Herein, unless otherwise stated, "substituted" means that at least one hydrogen atom in a functional group is substituted with a hydroxyl group, a halogen, an amino group, a (meth)acryloxy group, an unsubstituted $C_1$ to $C_{10}$ alkyl group, a $C_1$ to $C_{10}$ alkoxy group, a $C_3$ to $C_{10}$ cycloalkyl group, an unsubstituted $C_6$ to $C_{20}$ aryl group, an $C_7$ to $C_{20}$ arylalkyl group, a benzophenone group, a $C_6$ to $C_{20}$ aryl group substituted with a $C_1$ to $C_{10}$ alkyl group, a $C_1$ to $C_{10}$ alkyl group substituted with a $C_1$ to $C_{10}$ alkoxy group, or a $C_1$ to $C_{10}$ alkyl group substituted with a (meth)acryloxy group.

Herein, "halogen" means fluorine, chlorine, bromine, or iodine.

Herein, "hetero" means nitrogen, oxygen, sulfur, or phosphorus.

Hereinafter, a composition for window films according to one embodiment of the present invention will be described.

The composition for window films according to the embodiment includes: a crosslinking agent represented by Formula 1; an epoxy group-containing siloxane resin; and an initiator.

$$R^X\text{-X}-Z-Y\text{-}R^Y \qquad \text{<Formula 1>}$$

(where in Formula 1, $R^X$ and $R^Y$ are each independently a glycidyl group, a glycidyl group-containing functional group, an alicyclic epoxy group, or an alicyclic epoxy group-containing functional group;

X and Y are each independently a single bond, an oxygen atom, a sulfur atom, a substituted or unsubstituted $C_1$ to $C_{20}$ alkylene group, *—(C=O)—*, *—O—(C=O)—*, *—(C=O)—O—*, *—O—(C=O)—O—*, *-Xa-(C=O)-Ya-*, *-Xa-O—(C=O)-Ya-*, *-Xa-(C=O)—O-Ya-* or *-Xa-O—(C=O)—O-Ya-* (* is a linking site of an element, and Xa and Ya are each independently a substituted or unsubstituted $C_1$ to $C_{20}$ alkylene group, a substituted or unsubstituted $C_3$ to $C_{20}$ cycloalkylene group, a substituted or unsubstituted $C_6$ to $C_{20}$ arylene group, or a substituted or unsubstituted $C_7$ to $C_{20}$ arylalkylene group); and Z is a substituted or unsubstituted $C_5$ to $C_{30}$ monocyclic alkylene group, a substituted or unsubstituted $C_5$ to $C_{30}$ fused polycyclic alkylene group, a substituted or unsubstituted $C_5$ to $C_{30}$ spirocyclic alkylene group, a substituted or unsubstituted $C_7$ to $C_{30}$ polycyclic arylalkylene group, a substituted or unsubstituted $C_8$ to $C_{30}$ benzo-fused cycloalkylene group, a substituted or unsubstituted $C_8$ to $C_{30}$ benzo-fused hetero-cycloalkylene group, or *-Za-Zb-Zc-* (* is a linking site of an element, Za and Zc are each independently a substituted or unsubstituted $C_5$ to $C_{30}$ monocyclic alkylene group, a substituted or unsubstituted $C_5$ to $C_{30}$ fused polycyclic alkylene group, a substituted or unsubstituted $C_5$ to $C_{30}$ spirocyclic alkylene group, a substituted or unsubstituted $C_6$ to $C_{30}$ monocyclic or polycyclic arylene group, a substituted or unsubstituted $C_7$ to $C_{30}$ monocyclic or polycyclic arylalkylene group, a substituted or unsubstituted $C_8$ to $C_{30}$ benzo-fused cycloalkylene group, or a substituted or unsubstituted $C_8$ to $C_{30}$ benzo-fused hetero-cycloalkylene group, and Zb is a single bond or a substituted or unsubstituted $C_1$ to $C_{20}$ alkylene group), and Z can be epoxidized).

In Formula 1, "X is a single bond" means that $R^X$ and Z are directly bonded to each other without any intervening element, that is, (*-$R^X$-Z). In Formula 1, "Y is a single bond" means that $R^Y$ and Z are directly bonded to each other without any intervening element, that is, (*—Z-$R^Y$). In Formula 1, "Zb is a single bond" means that Za and Zc are directly bonded to each other without any intervening element, that is, (*-Za-Zc-*).

In Formula 1, the term "fused polycyclic alkylene group" means a cycloalkylene group composed of 2 to 6 rings sharing two carbon atoms.

In Formula 1, the term "spirocyclic alkylene group" means a cycloalkylene group composed of 2 to 6 rings sharing one carbon atom.

In Formula 1, the term "benzo-fused cycloalkylene group" means a functional group in which a benzene group and a cycloalkyl group share two carbon atoms.

In Formula 1, the term "benzo-fused hetero-cycloalkylene group" means a functional group in which a benzene group and a hetero-cycloalkyl group share two carbon atoms.

The composition for window films according to the embodiment includes the epoxy group-containing siloxane resin and the crosslinking agent represented by Formula 1, thereby improving harness and flexibility of the window film while suppressing curling of the window film. Particularly, the crosslinking agent represented by Formula 1 can improve hardness and flexibility of the window film while remarkably suppressing curling of the window film by containing the cycloalkylene group, the arylalkylene group, the hetero-cycloalkylene group or the like, in Z or through epoxidation of these groups.

Specifically, $R^X$ and $R^Y$ may be each independently a glycidoxy group. Specifically, X and Y are each independently a single bond, *—(C═O)—*, or a substituted or unsubstituted $C_1$ to $C_{10}$ alkylene group. More specifically, X and Y are each independently a single bond, *—(C═O)—*, or a substituted or unsubstituted methylene group, ethylene group, propylene group, butylene group, pentylene group, hexylene group, heptylene group, octylene group, nonylene group, or decylene group.

Specifically, Z may be a substituted or unsubstituted $C_5$ to $C_{30}$ monocyclic alkylene group, a substituted or unsubstituted $C_5$ to $C_{30}$ fused polycyclic alkylene group, a substituted or unsubstituted $C_5$ to $C_{30}$ spirocyclic alkylene group, a substituted or unsubstituted $C_8$ to $C_{30}$ benzo-fused cycloalkylene group, a substituted or unsubstituted $C_8$ to $C_{30}$ benzo-fused hetero-cycloalkylene group, or *-Za-Zb-Zc-*, in which * is a linking site of an element, Za and Zc are each independently a substituted or unsubstituted $C_5$ to $C_{20}$ monocyclic alkylene group, and Zb is a single bond or a substituted or unsubstituted $C_1$ to $C_{10}$ alkylene group. Z can be epoxidized. More specifically, Z may include at least one of the compounds represented by Formula A:

<Formula A>

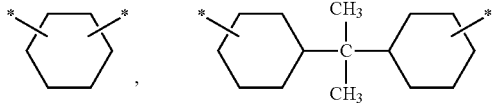

(In Formula A, * is a linking site of an element)

Specifically, the crosslinking agent of Formula 1 may include compounds shown in the following Table 1.

TABLE 1

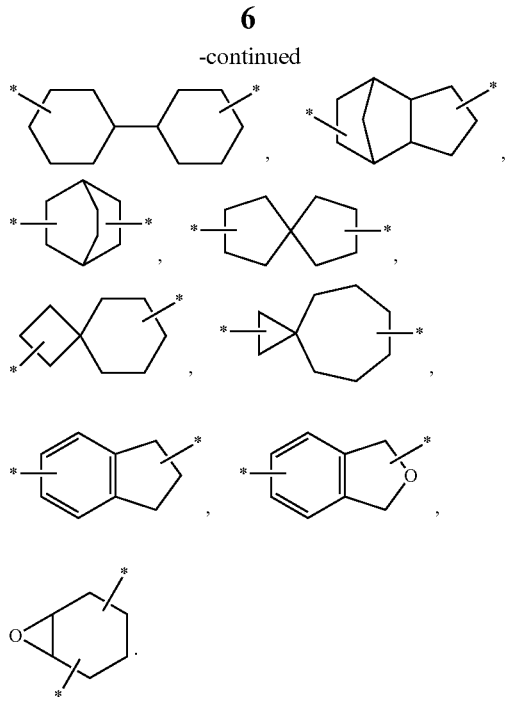

| No. | $R^X$ | $R^Y$ | X | Z | Y |
|---|---|---|---|---|---|
| 1 | Glycidoxy group | Glycidoxy group | *—(C═O)—* | (cyclohexylene) | *—(C═O)—* |
| 2 | Glycidoxy group | Glycidoxy group | *—(C═O)—* | (epoxy cyclohexylene) | *—(C═O)—* |
| 3 | Glycidoxy group | Glycidoxy group | Single bond | (bis-cyclohexyl-C(CH3)2) | Single bond |
| 4 | Glycidoxy group | Glycidoxy group | —CH$_2$— | (cyclohexylene) | —CH$_2$— |
| 5 | Glycidoxy group | Glycidoxy group | Single bond | (cyclohexylene) | Single bond |
| 6 | Glycidoxy group | Glycidoxy group | Single bond | (bicyclohexyl) | Single bond |
| 7 | Glycidoxy group | Glycidoxy group | —CH$_2$— | (decahydronaphthalene) | —CH$_2$— |

More specifically, the crosslinking agent of Formula 1 may include represented by any one of Formulae 1-1 to 1-7:

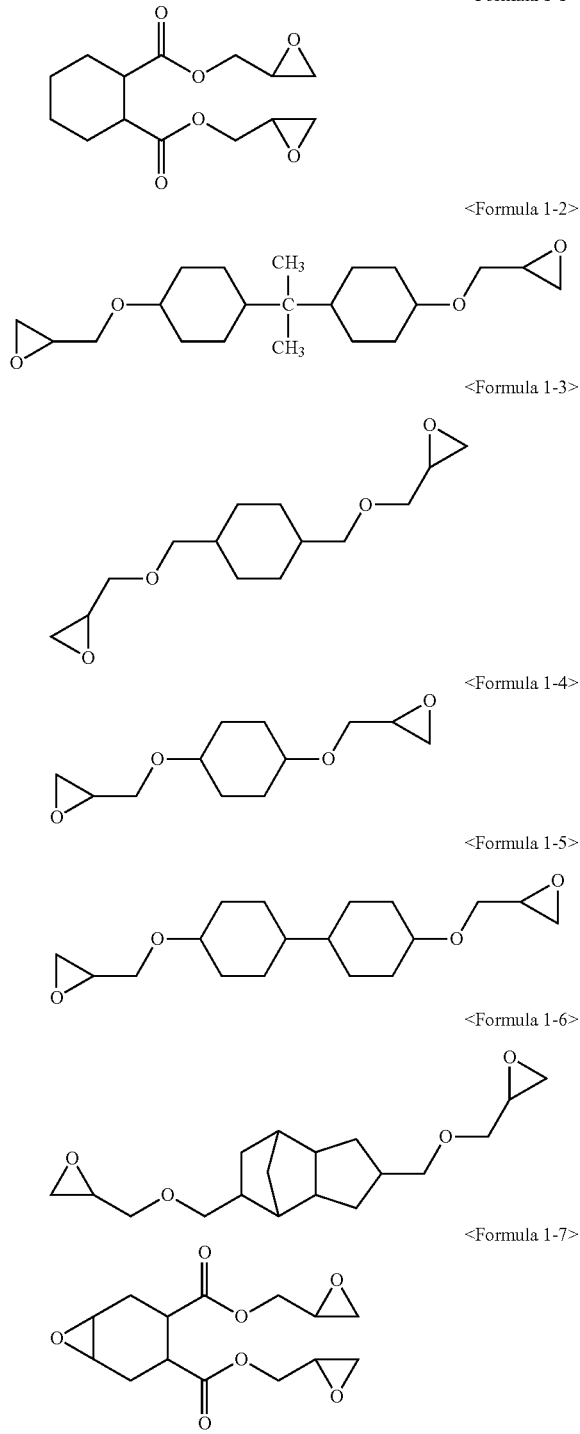

As the crosslinking agent of Formula 1 in the composition for window films, these compounds may be used alone or as a mixture thereof.

In the composition for window films, the crosslinking agent of Formula 1 may be present in an amount of about 1 wt % to about 40 wt %, specifically about 5 wt % to about 25 wt %, more specifically about 10 wt % to about 25 wt %, for example, about 10 wt %, about 11 wt %, about 12 wt %, about 13 wt %, about 14 wt %, about 15 wt %, about 16 wt %, about 17 wt %, about 18 wt %, about 19 wt %, about 20 wt %, about 21 wt %, about 22 wt %, about 23 wt %, about 24 wt %, or about 25 wt %, based on the total amount of the crosslinking agent of Formula 1 and the epoxy group-containing siloxane resin in terms of solid content. Within this range, the composition for window films can improve hardness and flexibility of the window film while suppressing curling of the window film. Since the crosslinking agent of Formula 1 is present in a specific ratio with respect to the epoxy group-containing siloxane resin in the composition for window films in terms of solid content, the crosslinking agent of Formula 1 can be sufficiently mixed with the epoxy group-containing siloxane resin, thereby improving transparency, hardness and flexibility of the window film while suppressing curling of the window film.

The crosslinking agent of Formula 1 may be a commercially available product. Alternatively, the crosslinking agent of Formula 1 may be prepared by a typical method.

Next, the epoxy group-containing siloxane resin will be described.

The epoxy group-containing siloxane resin may be cured together with the crosslinking agent of Formula 1 to form a window film. Specifically, the epoxy group-containing siloxane resin may be represented by Formula 2:

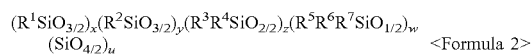

(where in Formula 2, $R^1$ is an epoxy group; $R^2$ is an epoxy group, a hydrogen atom, a substituted or unsubstituted $C_1$ to $C_{20}$ alkyl group, a substituted or unsubstituted $C_2$ to $C_{20}$ alkenyl group, a substituted or unsubstituted $C_2$ to $C_{20}$ alkynyl group, a substituted or unsubstituted $C_3$ to $C_{20}$ cycloalkyl group, a substituted or unsubstituted $C_6$ to $C_{20}$ aryl group, a substituted or unsubstituted $C_7$ to $C_{20}$ arylalkyl group, a substituted or unsubstituted $C_6$ to $C_{20}$ hetero-aryl group, or a substituted or unsubstituted $C_7$ to $C_{20}$ hetero-arylalkyl group;

$R^3$, $R^4$, $R^5$, $R^6$ and $R^7$ are each independently an epoxy group, a hydrogen atom, a substituted or unsubstituted $C_1$ to $C_{20}$ alkyl group, a substituted or unsubstituted $C_2$ to $C_{20}$ alkenyl group, a substituted or unsubstituted $C_2$ to $C_{20}$ alkynyl group, a substituted or unsubstituted $C_3$ to $C_{20}$ cycloalkyl group, a substituted or unsubstituted $C_6$ to $C_{20}$ aryl group, a substituted or unsubstituted $C_7$ to $C_{20}$ arylalkyl group, a substituted or unsubstituted $C_6$ to $C_{20}$ hetero-aryl group, or a substituted or unsubstituted $C_7$ to $C_{20}$ hetero-arylalkyl group; and $0 < x \leq 1$, $0 \leq y < 1$, $0 \leq z < 1$, $0 \leq w < 1$, $0 \leq u < 1$, and $x+y+z+w+u=1$).

In one embodiment, the epoxy group-containing siloxane resin may be a siloxane rein composed of a T unit, as represented by Formula 2-1:

(where in Formula 2-1, $R^1$ is the same as defined in Formula 2 and x is 1).

In another embodiment, the epoxy group-containing siloxane resin may represented by Formula 2-2:

(where in Formula 2-2, $R^1$, $R^3$ and $R^4$ are the same as defined in Formula 2, $0<x<1$, $0<z<1$, and $x+z=1$). More specifically, $R^1$, $R^3$ and $R^4$ are each independently a (3,4-epoxycyclohexyl)methyl) group, a (3,4-epoxycyclohexyl) ethyl) group, a (3,4-epoxycyclohexyl)propyl) group, a 3-glycidoxy propyl group, a methyl group, or an ethyl group. Specifically, in Formula 2-2, x may range from about 0.2 to about 0.99 and z may range from about 0.01 to about 0.8. More specifically, x may range from about 0.5 to about 0.99 and z may range from about 0.01 to about 0.5. Within these ranges, the composition for window films can improve hardness and flexibility of the window film while suppressing curling of the window film.

Specifically, the epoxy group-containing siloxane resin may represented by any one of Formula 2-2A to Formula 2-2F:

$(EcSiO_{3/2})_x((Me)_2SiO_{2/2})_z$ <Formula 2-2A>

$(EcSiO_{3/2})_x((Et)_2SiO_{2/2})_z$ <Formula 2-2B>

$(EcSiO_{3/2})_x(MeEtSiO_{2/2})_z$ <Formula 2-2C>

$(GpSiO_{3/2})_x((Me)_2SiO_{2/2})_z$ <Formula 2-2D>

$(GpSiO_{3/2})_x((Et)_2SiO_{2/2})_z$ <Formula 2-2E>

$(GpSiO_{3/2})_x(MeEtSiO_{2/2})_z$ <Formula 2-2F>

(where in Formula 2-2A to Formula 2-2F, Ec is a (3,4-epoxycyclohexyl)ethyl group, Gp is a 3-glycidoxy propyl group, Me is a methyl group, Et is an ethyl group, $0<x<1$, $0<z<1$, and $x+z=1$).

In another embodiment, the epoxy group-containing siloxane resin may be represented by Formula 2-3:

$(R^1SiO_{3/2})_x(R^2SiO_{3/2})_y$ <Formula 2-3>

(where in Formula 2-3, $R^1$ and $R^2$ are the same as defined in Formula 2 and are different from each other, $0<x<1$, $0<y<1$, and $x+y=1$). More specifically, $R^1$ and $R^2$ are each independently a (3,4-epoxycyclohexyl)methyl group, a (3,4-epoxycyclohexyl)ethyl group, a (3,4-epoxycyclohexyl)propyl group, a 3-glycidoxy propyl group, a methyl group, or an ethyl group. Specifically, in Formula 2-3, x may range from about 0.5 to about 0.99 and y may range from about 0.01 to about 0.5. More specifically, x may range from about 0.9 to about 0.97 and y may range from about 0.03 to about 0.1. Within these ranges, the composition can improve hardness and flexibility of the window film while suppressing curling of the window film.

The epoxy group-containing siloxane resin may have a weight average molecular weight of about 2,000 to about 20,000, specifically about 4,500 to about 10,000, for example, about 5,000, about 5,500, about 6,000, about 6,500, about 7,000, about 7,500, about 8,000, about 8,500, about 9,000, about 9,500, or about 10,000. Within this range, the siloxane resin can support a coating layer of the window film. The epoxy group-containing siloxane resin may have polydispersity index (PDI) of about 1.0 to about 3.0, specifically about 1.5 to about 2.5. Within this range, the composition can have good wettability and can secure stable coating properties. The epoxy group-containing siloxane resin may have an epoxy equivalent weight of about 0.1 mol/100 g to about 1.0 mol/100 g, specifically about 0.3 mol/100 g to about 0.8 mol/100 g. Within this range, the composition has good coating properties and can provide stable coating properties.

The epoxy group-containing siloxane resin may include one or at least two $(R^1SiO_{3/2})$ alone, one or at least two $(R^1SiO_{3/2})$ and one or at least two $(R^2R^3SiO_{2/2})$, and/or one or at least two $(R^4R^5R^6SiO_{1/2})$, and/or $(SiO_{4/2})$. In the composition, these epoxy group-containing siloxane resins may be used alone or as a mixture thereof.

In the composition for window films, the epoxy group-containing siloxane resin may be present in an amount of about 60 wt % to about 99 wt %, specifically about 75 wt % to about 95 wt %, more specifically about 75 wt % to about 90 wt %, for example, about 75 wt %, about 76 wt %, about 77 wt %, about 78 wt %, about 79 wt %, about 80 wt %, about 81 wt %, about 82 wt %, about 83 wt %, about 84 wt %, about 85 wt %, about 86 wt %, about 87 wt %, about 88 wt %, about 89 wt %, or about 90 wt %, based on the total amount of the crosslinking agent of Formula 1 and the epoxy group-containing siloxane resin in terms of solid content. Within this range, the composition can improve hardness and flexibility of the window film while suppressing curling of the window film.

The epoxy group-containing siloxane resin may be prepared through hydrolysis and condensation of a silicone monomer or a silicon monomer mixture. Hydrolysis and condensation of the silicone monomer mixture may be performed by a typical method for preparing a siloxane resin. Hydrolysis may include reacting the monomer mixture with a mixture of water and at least one of an acid and a base. Specifically, the acid may be a strong acid such as HCl or $HNO_3$, and the base may be a strong base such as NaOH or KOH. Hydrolysis may be performed at about 20° C. to about 100° C. for about 10 minutes to about 7 hours. Under these conditions, it is possible to improve efficiency in hydrolysis of the silicone monomer. Condensation may be performed at about 20° C. to about 100° C. for about 10 minutes to about 12 hours under the same conditions as hydrolysis. Under these conditions, it is possible to improve efficiency in condensation of the silicone monomer.

A silicone monomer for $(R^1SiO_{3/2})$ may include at least one of 2-(3,4-epoxycyclohexyl)ethyltriethoxysilane, 2-(3,4-epoxycyclohexyl)ethyltrimethoxysilane, 3-glycidoxypropyltrimethoxysilane, and 3-glycidoxypropyltriethoxysilane, without being limited thereto A silicone monomer for $(R^2SiO_{3/2})$ may include at least one of 2-(3,4-epoxycyclohexyl)ethyltriethoxysilane, 2-(3,4-epoxycyclohexyl)ethyltrimethoxysilane, 3-glycidoxy propyltrimethoxysilane, 3-glycidoxy propyltriethoxysilane, methyltrimethoxysilane, ethyltrimethoxysilane, phenyltrimethoxysilane, propylethyltrimethoxysilane, vinyltrimethoxysilane, vinyltriethoxysilane, chloropropyltrimethoxysilane, 3-aminopropyltriethoxysilane, and 3-(meth)acryloxypropyltrimethoxysilane, without being limited thereto A silicone monomer for $(R^3R^4SiO_{2/2})$ may include at least one of 2-(3,4-epoxycyclohexyl)ethylmethyldiethoxysilane, dimethyldimethoxysilane, and (3-glycidoxypropyl)methyldiethoxysilane, without being limited thereto A silicone monomer for $(R^5R^6R^7SiO_{1/2})$ may include at least one of triphenylmethoxysilane, triphenylethoxysilane, and trimethylmethoxysilane, without being limited thereto A silicone monomer for $(SiO_{4/2})$ may include at least one of tetramethoxysilane, tetraethoxysilane, tetrapropoxysilane, tetrabutoxysilane, and tetraisopropoxysilane, without being limited thereto Next, the initiator will be described.

The initiator serves to cure the crosslinking agent of Formula 1 and the epoxy group-containing siloxane resin, and may include at least one of a photocationic initiator and a photo-radical initiator. The initiator may be used alone or as a mixture thereof.

As the photocationic initiator, any typical photocationic initiator known to those skilled in the art may be used. Specifically, the photocationic initiator may include an onium salt containing a cation and an anion. Specifically, examples of the cation may include: diaryliodonium such as diphenyliodonium, 4-methoxydiphenyliodonium, bis(4-methylphenyl)iodonium, bis(4-tert-butylphenyl)iodonium, and bis(dodecylphenyl)iodonium; triarylsulfonium such as triphenylsulfonium and diphenyl-4-thiophenoxyphenylsulfonium; bis[4-(diphenylsulfonio)phenyl]sulfide, and the like. Specifically, examples of the anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), tetrakis(pentafluorophenyl)borate, and the like.

In the composition for window films, the initiator may be present in an amount of about 0.01 parts by weight to about 20 parts by weight, specifically about 0.1 parts by weight to about 5 parts by weight, relative to 100 parts by weight of the crosslinking agent of Formula 1 and the epoxy group-containing siloxane resin. Within this range, the initiator can sufficiently cure the siloxane resin.

The composition for window films according to this embodiment may further include nanoparticles.

The nanoparticles can further improve hardness of a window film. The nanoparticles may include at least one of silica, aluminum oxide, zirconium oxide, and titanium oxide, without being limited thereto. The nanoparticles may be partially or entirely subjected to surface treatment with a silicone compound for mixing with the siloxane resin. The nanoparticles are not limited to a particular shape or size. Specifically, the nanoparticles may include spherical, flake, or amorphous particles. The nanoparticles may have an average particle size of about 1 nm to about 200 nm, specifically about 10 nm to about 50 nm. Within this range, the nanoparticles can increase hardness of the window film without affecting surface roughness and transparency of the window film. The nanoparticles may be present in an amount of about 0.1 parts by weight to about 60 parts by weight, specifically about 10 parts by weight to about 50 parts by weight, relative to 100 parts by weight of the crosslinking agent of Formula 1 and the epoxy group-containing siloxane resin. Within this range, the nanoparticles can increase hardness of the window film without affecting surface roughness and transparency thereof.

The composition for window films according to this embodiment may further include additives. The additives can provide additional functions to the window film. The additives may be any additives commonly used for window films in the related art. Specifically, the additives may include at least one of a UV absorbent, a reaction inhibitor, an adhesion promoter, a thixotropic agent, a conductivity imparting agent, a color adjusting agent, a stabilizer, an antistatic agent, an antioxidant, and a leveling agent, without being limited thereto. The reaction inhibitor may include ethynylcyclohexane. The adhesion promoter may include an epoxy or alkoxysilane group-containing silane compound. The thixotropic agent may include fumed silica. The conductivity imparting agent may include metal powder such as silver powder, copper powder, aluminum powder, and the like. The color adjusting agent may include pigments, dyes, and the like. The UV absorbent can improve light resistance of the window film. The UV absorbent may be any typical absorbent known to those skilled in the art. Specifically, the UV absorbent may include at least one of triazine, benzimidazole, benzophenone, and benzotriazole UV absorbents, without being limited thereto. The additives may be present in an amount of about 0.01 parts by weight to about 5 parts by weight, specifically about 0.1 parts by weight to about 2.5 parts by weight, relative to 100 parts by total weight of the crosslinking agent of Formula 1 and the epoxy group-containing siloxane resin. Within this range, the additives can improve hardness and flexibility of the window film while realizing inherent effects thereof.

The composition for window films according to this embodiment may further include a solvent to improve coatability, wettability or processability. The solvent may include at least one of methylethylketone, methylisobutylketone, and propylene glycol monomethyletheracetate, without being limited thereto.

Next, a flexible window film according to one embodiment will be described with reference to FIG. 1. FIG. 1 is a sectional view of a flexible window film according to one embodiment of the invention.

Referring to FIG. 1, a flexible window film 100 according to one embodiment of the invention may include a base layer 110 and a coating layer 120. The coating layer 120 may be formed of the composition for window films according to the embodiment of the present invention.

The base layer 110 can improve mechanical strength of the flexible window film 100 by supporting the coating layer 120 and the flexible window film 100. The base layer 110 may be attached to a display part, a touchscreen panel or a polarizing plate via an adhesive layer or the like.

The base layer 110 may be formed of an optically transparent flexible resin. For example, the resin may include polyester resins including polyethylene terephthalate, polyethylene naphthalate, polybutylene terephthalate, polybutylene naphthalate, and the like, polycarbonate resins, polyimide resins, polystyrene resins, poly(meth)acrylate resins including poly(methyl methacrylate), and the like. These resins may be used alone or as a mixture thereof.

The base layer 110 may have a thickness of about 10 μm to about 200 μm, specifically about 20 μm to about 150 μm. Within this range of thickness, the base layer can be used in the flexible window film.

The coating layer 120 may be formed on the base layer 110 to protect the base layer 110, the display part, the touchscreen panel or the polarizing plate, and has high flexibility and high hardness to be used for a flexible display.

The coating layer 120 may have a thickness of about 5 μm to about 100 μm, specifically about 10 μm to about 80 μm. Within this range of thickness, the coating layer can be used in a flexible window film.

Although not shown in FIG. 1, functional surface layers such as an anti-reflection layer, an anti-glare layer, and a hard coating layer may be further formed on the other surface of the coating layer 120 to provide additional functions. In addition, although not shown in FIG. 1, further the coating layer 120 may be formed on the other surface of the base layer 110.

The flexible window film 100 is optically transparent and may be used in a transparent display. Specifically, the flexible window film 100 may have a transmittance of about 88% or more, specifically about 88% to about 100%, in the visible range, specifically in a wavelength range of about 400 nm to about 800 nm. Within this range, the flexible window film can be used as a flexible window film.

The flexible window film 100 may have a pencil hardness of about 7H or more, a radius of curvature of about 5.0 mm or less, and a curl of about 15 mm or less. Within these ranges, the flexible window film exhibits good properties in terms of hardness, flexibility and light resistance, and suffers less curling to be used as a flexible window film. Specifically, the flexible window film 100 may have a pencil hardness of about 7H to about 9H, a radius of curvature of about 1.0 mm to about 5.0 mm, and a curl of about 6 mm or less.

The flexible window film 100 may have a thickness of about 50 μm to about 300 μm. Within this range of thickness, the flexible window film can be used as a flexible window film.

The flexible window film 100 may be formed by coating the composition for window films according to the embodiment onto the base layer 110, followed by curing.

A method of coating the composition for window films onto the base layer 110 is not particularly limited. For example, the composition may be coated onto the base layer by bar coating, spin coating, dip coating, roll coating, flow coating, or die coating. The composition may be coated to a thickness of about 5 μm to about 100 μm on the base layer 110. Within this range of thickness, a desired coating layer can be secured while providing good properties in terms of hardness, flexibility and reliability.

Curing is performed to form the coating layer by curing the composition for window films, and may include at least one of photocuring and heat curing. Photocuring may include irradiating the coated composition at about 10 mJ/cm² to about 1,000 mJ/cm² at a wavelength of about 400 nm or less. Heat curing may be performed at a temperature of about 40° C. to about 200° C. for about 1 hour to about 30 hours. Under these conditions, the composition for window films can be sufficiently cured. For example, heat curing may be performed after photocuring in order to achieve higher hardness of the coating layer.

Before curing the composition for window films coated onto the base layer 110, the method may further include drying the composition. When curing is performed after drying, it is possible to prevent increase in surface roughness of the coating layer due to photocuring or heat curing for a long period of time. Drying may be performed at about 40° C. to about 200° C. for about 1 minute to about 30 hours, without being limited thereto.

Next, a flexible window film according to another embodiment will be described with reference to FIG. 2. FIG. 2 is a sectional view of a flexible window film according to another embodiment of the invention.

Referring to FIG. 2, a flexible window film 200 according to another embodiment of the invention may include a base layer 110, a coating layer 120 formed on one surface of the base layer 110, and an adhesive layer 130 formed on the other surface of the base layer 110, in which the coating layer 120 may be formed of the composition for window films according to the embodiment of the present invention.

The adhesive layer 130 formed on the other surface of the base layer 110 can facilitate adhesion between the flexible window film and a touchscreen panel, a polarizing plate or a display part. The flexible window film according to this embodiment is substantially the same as the flexible window film according to the above embodiment excluding the adhesive layer. Thus, the following description will focus on the adhesive layer 130.

The adhesive layer 130 attaches the polarizing plate, the touchscreen panel, or the display part to the flexible window film 200 to be disposed under the flexible window film 200, and may be formed of an adhesive composition for the adhesive layer. Specifically, the adhesive layer 130 may be formed of an adhesive composition comprising an adhesive resin such as a (meth)acrylic resin, a urethane resin, a silicone resin, and an epoxy resin, a curing agent, a photoinitiator, and a silane coupling agent.

The (meth)acrylic resin is a (meth)acrylic copolymer having an alkyl group, a hydroxyl group, an aromatic group, a carboxylic acid group, an alicyclic group, a hetero-alicyclic group, and the like, and may include a typical (meth) acrylic copolymer. Specifically, the (meth)acrylic resin may be formed of a monomer mixture including at least one of a (meth)acrylic monomer containing a $C_1$ to $C_{10}$ unsubstituted alkyl group, a (meth)acrylic monomer containing a $C_1$ to $C_{10}$ alkyl group having at least one hydroxyl group, a (meth) acrylic monomer containing a $C_6$ to $C_{20}$ aromatic group, a (meth)acrylic monomer containing a carboxylic acid group, a (meth)acrylic monomer containing a $C_3$ to $C_{20}$ alicyclic group, and a (meth)acrylic monomer containing a $C_3$ to $C_{10}$ hetero-alicyclic group having at least one of nitrogen (N), oxygen (O), and sulfur (S).

The curing agent is a polyfunctional (meth)acrylate and may include a bifunctional (meth)acrylate such as hexanediol diacrylate; a trifunctional (meth)acrylate such as trimethylolpropane tri(meth)acrylate; a tetra-functional (meth) acrylate such as pentaerythritol tetra(meth)acrylate; a pentafunctional (meth)acrylate such as dipentaerythritol penta (meth)acrylate; and a hexa-functional (meth)acrylate such as dipentaerythritol hexa(meth)acrylate, without being limited thereto.

The photoinitiator is a typical photoinitiator and may include the photo-radical initiator described above.

The silane coupling agent may include an epoxy group-containing silane coupling agent such as 3-glycidoxypropyltrimethoxysilane.

The adhesive composition may include 100 parts by weight of the (meth)acrylic resin, about 0.1 parts by weight to about 30 parts by weight of the curing agent, about 0.1 parts by weight to about 10 parts by weight of the photoinitiator, and about 0.1 parts by weight to about 20 parts by weight of the silane coupling agent. With this composition, the adhesive layer formed of the adhesive composition can sufficiently attach the flexible window film to the display part, the touchscreen panel, or the polarizing plate.

The adhesive layer 130 may have a thickness of about 10 μm to about 100 μm. Within this range of thickness, the adhesive layer can sufficiently attach the flexible window film to an optical device such as a polarizing plate.

Next, a flexible display according to one embodiment will be described with reference to FIG. 3 and FIG. 4. FIG. 3 is a sectional view of a flexible display according to one embodiment of the present invention and FIG. 4 is a sectional view of one embodiment of a display part shown in FIG. 3.

Referring to FIG. 3, a flexible display 300 according to one embodiment of the invention includes a display part 350a, an adhesive layer 360, a polarizing plate 370, a touchscreen panel 380, and a flexible window film 390, which may include the flexible window film according to the embodiments of the invention.

The display part 350a serves to drive the flexible display 300 and may include a substrate and an optical device formed on the substrate and including an OLED, an LED or an LCD device. FIG. 4 is a sectional view of one embodiment of the display part shown in FIG. 3. Referring to FIG. 4, the display part 350a includes a lower substrate 310, a thin film transistor 316, an organic light emitting diode 315, a flattening layer 314, a protective layer 318, and an insulating layer 317.

The lower substrate 310 supports the display part 350a, and the thin film transistor 316 and the organic light emitting diode 315 may be formed on the lower substrate 310. The lower substrate 310 may be formed with a flexible printed circuit board (FPCB) for driving the touchscreen panel 380. The flexible printed circuit board may further include a timing controller, a power source, and the like in order to drive an array of organic light emitting diodes.

The lower substrate 310 may include a substrate formed of a flexible resin. Specifically, the lower substrate 310 may include a flexible substrate such as a silicone substrate, a polyimide substrate, a polycarbonate substrate, and a polyacrylate substrate, without being limited thereto.

In a display area of the lower substrate 310, plural pixel domains are defined by plural driving wires (not shown) and plural sensor wires (not shown) intersecting each other and each of the pixel domains may be formed with an array of organic light emitting diodes, each of which includes the thin film transistor 316 and the organic light emitting diode 315 connected to the thin film transistor 316. In a non-display area of the lower substrate, a gate driver applying electric signals to the driving wires may be formed in the form of a gate-in panel. The gate-in panel circuit may be formed at one or both sides of the display area.

The thin film transistor 316 controls electric current flowing through a semiconductor by application of an electric field perpendicular to the electric current and may be formed on the lower substrate 310. The thin film transistor 316 may include a gate electrode 310a, a gate insulation layer 311, a semiconductor layer 312, a source electrode 313a, and a drain electrode 313b. The thin film transistor 316 may be an oxide thin film transistor which uses an oxide such as indium gallium zinc oxide (IGZO), ZnO, or TiO as the semiconductor layer, an organic thin film transistor which uses an organic material as the semiconductor layer, an amorphous silicon thin film transistor which uses amorphous silicon as the semiconductor layer, or a polycrystalline silicon thin film transistor which uses polycrystalline silicon as the semiconductor layer.

The flattening layer 314 covers the thin film transistor 316 and a circuit section 310b to flatten upper surfaces of the thin film transistor 316 and the circuit section 310b such that the organic light emitting diode 315 can be formed thereon. The flattening layer 314 may be formed of a spin-on-glass (SOG) film, a polyimide polymer, or a polyacrylic polymer, without being limited thereto.

The organic light emitting diode 315 realizes a display through self-emission, and may include a first electrode 315a, an organic light-emitting layer 315b, and a second electrode 315c, which are stacked in the stated order. Adjacent organic light emitting diodes may be isolated from each other by the insulating layer 317. The organic light emitting diode 315 may have a bottom emission type structure wherein light generated from the organic light-emitting layer 315b is emitted through the lower substrate, or a top-emission type structure wherein light from the organic light-emitting layer 315b is emitted through an upper substrate.

The protective layer 318 covers the organic light emitting diodes 315 to protect the organic light emitting diodes 315. The protective layer 318 may be formed of an inorganic material such as SiOx, SiNx, SiC, SiON, SiONC, and amorphous carbon (a-C), or an organic material such as (meth)acrylates, epoxy polymers, imide polymers, and the like. Specifically, the protective layer 318 may include an encapsulation layer in which an inorganic material layer and an organic material layer are sequentially stacked once or plural times.

Referring again to FIG. 3, the adhesive layer 360 attaches the display part 350a to the polarizing plate 370, and may be formed of an adhesive composition including a (meth)acrylate resin, a curing agent, an initiator, and a silane coupling agent.

The polarizing plate 370 can realize polarization of internal light or prevent reflection of external light to realize a display, or can increase contrast of the display. The polarizing plate may be composed of a polarizer alone. Alternatively, the polarizing plate may include a polarizer and a protective film formed on one or both surfaces thereof. Alternatively, the polarizing plate may include a polarizer and a protective coating layer formed on one or both surfaces thereof. As the polarizer, the protective film and the protective coating layer, a typical polarizer, a typical protective film and a typical protective coating layer known in the art may be used.

The touchscreen panel 380 generates electrical signals through detection of variation in capacitance when a human body or a conductor such as a stylus touches the touchscreen panel, and the display part 350a may be driven by such electrical signals. The touchscreen panel 380 is formed by patterning a flexible conductor, and may include first sensor electrodes and second sensor electrodes each formed between the first sensor electrodes and intersecting the first sensor electrodes. The touchscreen panel 380 may include a conductive material such as metal nanowires, conductive polymers, and carbon nanotubes, without being limited thereto.

The flexible window film 390 may be disposed as an outermost layer of the flexible display 300 to protect the flexible display.

Although not shown in FIG. 3, adhesive layers may be further formed between the polarizing plate 370 and the touchscreen panel 380 and/or between the touchscreen panel 380 and the flexible window film 390 to reinforce coupling between the polarizing plate, the touchscreen panel, and the flexible window film. The adhesive layers may be formed of an adhesive composition including a (meth)acrylate resin, a curing agent, an initiator, and a silane coupling agent. Although not shown in FIG. 3, a polarizing plate may be further disposed under the display part 350a to realize polarization of internal light.

Next, a flexible display according to another embodiment of the present invention will be described with reference to FIG. 5. FIG. 5 is a sectional view of a flexible display according to another embodiment of the present invention.

Referring to FIG. 5, a flexible display 400 according to another embodiment of the invention includes a display part 350a, a touchscreen panel 380, a polarizing plate 370, and a flexible window film 390, which may include the flexible window film according to the embodiments of the invention. The flexible display according to this embodiment is substantially the same as the flexible display according to the above embodiment except that the touchscreen panel 380 is disposed under the polarizing plate 370 instead of being directly formed on the flexible window film 390. In addition, the touchscreen panel 380 may be formed together with the display part 350a. In this case, since the touchscreen panel 380 is formed together with the display part 350a on the display part 350a, the flexible display according to this embodiment is thinner and brighter than the flexible display according to the above embodiment, thereby providing better visibility. Furthermore, the touchscreen panel 380 may be formed by deposition, without being limited thereto. Although not shown in FIG. 5, adhesive layers may be further formed between the display part 350a and the touchscreen panel 380, between the touchscreen panel 380 and the polarizing plate 370, and/or between the polarizing plate 370 and the flexible window film 390 to reinforce mechanical strength of the display. The adhesive layers may be formed of an adhesive composition including a (meth)acrylate resin, a curing agent, an initiator, and a silane coupling agent. Although not shown in FIG. 5, a polarizing plate may be further disposed under the display part 350a to provide a good display image through polarization of internal light.

Next, a flexible display according to a further embodiment of the present invention will be described with reference to FIG. 6. FIG. 6 is a sectional view of a flexible display according to a further embodiment of the present invention. Referring to FIG. 6, a flexible display 500 according to a further embodiment of the invention includes a display part 350b, an adhesive layer 360, and a flexible window film 390, which may include the flexible window film according to the embodiments of the invention. The flexible display according to this embodiment is substantially the same as the flexible display according to the one embodiment except that the flexible display can be driven by the display part 350b alone and the polarizing plate and the touchscreen panel are omitted.

The display part 350a may include a substrate and an optical device formed on the substrate and including an OLED, an LED or an LCD device. The display part 350b may further include a touchscreen panel therein.

Hereinafter, the present invention will be described in more detail with reference to some examples. It should be understood that these examples are provided for illustration only and are not to be construed in any way as limiting the present invention.

Preparative Example 1: Siloxane Resin 100 g of a monomer mixture comprising 95 mol % of 2-(3,4-epoxycyclohexyl)ethyltriethoxysilane (KBM-303, Shin-Etsu Chemical Co., Ltd.) and 5 mol % of dimethyldimethoxysilane (UMT Co., Ltd.) and 100 g of toluene were placed in a 500 ml 3-neck flask. 0.5 mol % of KOH and 150 mol % of water were added to the monomer mixture, and stirred at 70° C. for 2 hours. The resulting material was cooled to room temperature and 100 g of distilled water was added to the 3-neck flask. Then, a water layer was removed through stirring and settlement, and this process was repeated four times. Thereafter, the solvent was removed from the organic layer using a vacuum distillation apparatus, thereby preparing a siloxane resin (weight average molecular weight: 5,000, as measured by gel chromatography (GPC), $(EcSiO_{3/2})_{0.95}((Me)_2SiO_{2/2})_{0.05})$.

Preparative Example 2: Siloxane Resin

A siloxane resin (weight average molecular weight: 4,900, as measured by GPC, $(EcSiO_{3/2})_{0.90}((Me)_2SiO_{2/2})_{0.10})$ was prepared in the same manner as in Preparative Example 1 except that a monomer mixture comprising 90 mol % of 2-(3,4-epoxycyclohexyl)ethyltriethoxysilane and 10 mol % of dimethyldimethoxy silane was used.

Example 1

A composition for window films was prepared by mixing 5 g of a mixture of 85 wt % of the siloxane resin (A1) of Preparative Example 1 and 15 wt % of diglycidyl 1,2-cyclohexanedicarboxylate (B1) of Formula 1-1 (Sigma-Aldrich) as a crosslinking agent, 0.1 g of diphenyliodonium hexafluorophosphate (Sigma-Aldrich) as an initiator (2 parts by weight relative to 100 parts by weight of the mixture), and 2.0 g of methylethylketone.

The prepared composition for window films was deposited onto a polyethylene terephthalate film (TA043, thickness: 80 μm, 15 cm×15 cm, Toyobo Co., Ltd.), dried at 80° C. for 4 minutes, irradiated with UV light at 500 mJ/cm², and heated at 80° C. for 12 hours, thereby forming a window film having a 50 μm thick coating layer.

Example 2

A window film was prepared in the same manner as in Example 1 except that 85 wt % of the siloxane resin (A2) of Preparative Example 2 was used instead of 85 wt % of the siloxane resin (A1) of Preparative Example 1.

Example 3

A window film was prepared in the same manner as in Example 1 except that 15 wt % of Epalloy 5000 (B2) of Formula 1-2 (CVC Specialty Chemical Co., Ltd.) was used instead of 15 wt % of diglycidyl 1,2-cyclohexanedicarboxylate (B1).

Example 4

A window film was prepared in the same manner as in Example 1 except that 85 wt % of the siloxane resin (A2) of Preparative Example 2 was used instead of 85 wt % of the siloxane resin (A1) of Preparative Example 1 and 15 wt % of Epalloy 5000 (B2)(CVC Specialty Chemical Co., Ltd.) was used instead of 15 wt % of diglycidyl 1,2-cyclohexanedicarboxylate (B1).

Example 5

A window film was prepared in the same manner as in Example 1 except that 15 wt % of 1,4-cyclohexanedimethanol diglycidyl ether (B3) of Formula 1-3 (Sigma-Aldrich) was used instead of 15 wt % of diglycidyl 1,2-cyclohexanedicarboxylate (B1).

Example 6

A window film was prepared in the same manner as in Example 1 except that 85 wt % of the siloxane resin (A2) of Preparative Example 2 was used instead of 85 wt % of the siloxane resin (A1) of Preparative Example 1 and 15 wt % of 1,4-cyclohexanedimethanol diglycidyl ether (B3) (Sigma-Aldrich) was used instead of 15 wt % of diglycidyl 1,2-cyclohexanedicarboxylate (B1).

Example 7

A window film was prepared in the same manner as in Example 1 except that S-186 (B4) of Formula 1-7 (Synasia Inc.) was used instead of 15 wt % of diglycidyl 1,2-cyclohexanedicarboxylate (B1).

Comparative Example 1

A window film was prepared in the same manner as in Example 1 except that 15 wt % of CY-179 (b1) (Formula b1) (Sigma-Aldrich) was used instead of 15 wt % of diglycidyl 1,2-cyclohexanedicarboxylate (B1).

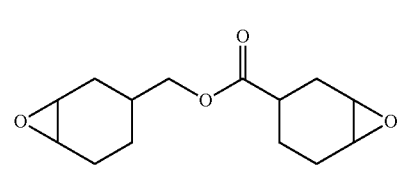

<Formula b1>

Comparative Example 2

A window film was prepared in the same manner as in Example 2 except that 15 wt % of CY-179 (b1) was used instead of 15 wt % of diglycidyl 1,2-cyclohexanedicarboxylate (B1).

Comparative Example 3

A window film was prepared in the same manner as in Example 1 except that 15 wt % of neopentylene glycol diglycidyl ether (b2) (Formula b2) (Sigma-Aldrich) was used instead of 15 wt % of diglycidyl 1,2-cyclohexanedicarboxylate (B1).

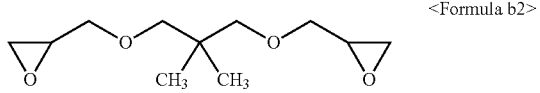

<Formula b2>

Comparative Example 4

A window film was prepared in the same manner as in Example 2 except that 15 wt % of neopentylene glycol diglycidyl ether (b2) (Sigma-Aldrich) was used instead of 15 wt % of diglycidyl 1,2-cyclohexanedicarboxylate (B1).

The amounts of the siloxane resins and the crosslinking agents used in Examples and Comparative Examples are shown in Tables 2 and 3.

The window films prepared in Examples and Comparative Examples were evaluated as to Properties (1) to (3) and evaluation results are shown in Tables 2 and 3.

(1) Pencil hardness: Pencil hardness was measured on a coating layer of a window film using a pencil hardness tester (Heidon) in accordance with JIS K5400. Pencil hardness was measured using pencils of 6B to 9H (Mitsubishi Co., Ltd.) under conditions of a pencil load of 1 kg on the coating layer, a scratch angle of 45°, and a scratch speed of 60 mm/min. When the coating layer had one or more scratches after being tested 5 times using a certain pencil, pencil hardness was measured again using another pencil having one-level lower pencil hardness than the previous pencil. A pencil hardness value allowing no scratch to be observed all five times on the coating layer was taken as pencil hardness of the coating layer.

(2) Radius of curvature: A window film (width×length× thickness, 3 cm×15 cm×130 µm, base layer thickness: 80 µm, coating layer thickness: 50 µm) was wound around a jig for measuring radius of curvature, kept wound for 5 seconds or more, unwound, and then observed with the naked eye to determine whether the window film had cracks. Here, the radius of curvature was measured by winding the window film around the jig such that the coating layer of the window film contacted the jig to a compression direction, and was determined by a minimum radius of a jig causing no cracks on the window film, as measured while gradually decreasing the diameters of jigs from a jig having the maximum diameter.

(3) Curling: Referring to FIG. 7, each of the window films 1 (thickness: 130 µm, base layer thickness: 80 µm, coating layer thickness: 50 µm) prepared in Examples and Comparative Examples was cut into a specimen having a size of 10 cm×10 cm. The window film specimen was placed on a floor surface 2 such that the coating layer faced upwards, and was left at 25° C. and 40% RH. Thereafter, when curling of the window film occurred, each heights H from the floor surface 2 to four edges of the window film 1 were measured and averaged.

TABLE 2

|  |  | Example | | | | | | |
|---|---|---|---|---|---|---|---|---|
|  |  | 1 | 2 | 3 | 4 | 5 | 6 | 7 |
| Siloxane resin (parts by weight) | (A1) | 85 | — | 85 | — | 85 | — | 85 |
|  | (A2) | — | 85 | — | 85 | — | 85 | — |
| Crosslinking agent (parts by weight) | (B1) | 15 | 15 | — | — | — | — | — |
|  | (B2) | — | — | 15 | 15 | — | — | — |
|  | (B3) | — | — | — | — | 15 | 15 | — |
|  | (B4) | — | — | — | — | — | — | 15 |
| Initiator (parts by weight) |  | 2 | 2 | 2 | 2 | 2 | 2 | 2 |
| Pencil hardness |  | 8H | 7H | 8H | 7H | 7H | 7H | 9H |
| Radius of curvature (mm) |  | 3 | 3 | 3 | 3 | 3 | 3 | 3 |
| Curling (mm) |  | 4.0 | 3.7 | 2.6 | 2.8 | 5.7 | 5.5 | 3.2 |

TABLE 3

|  |  | Comparative Example | | | |
|---|---|---|---|---|---|
|  |  | 1 | 2 | 3 | 4 |
| Siloxane resin (parts by weight) | (A1) | 85 | — | 85 | — |
|  | (A2) | — | 85 | — | 85 |
| Crosslinking agent (parts by weight) | (b1) | 15 | 15 | — | — |
|  | (b2) | — | — | 15 | 15 |
| Initiator (parts by weight) |  | 2 | 2 | 2 | 2 |
| Pencil hardness |  | 5H | 6H | 5H | 5H |
| Radius of curvature (mm) |  | 4 | 4 | 3 | 3 |
| Curling (mm) |  | 19 | 20 | 35 | 34 |

As shown in Table 2, each of the flexible window films of Examples had a high pencil hardness of 8H or more and a radius of curvature of 5.0 mm or less to provide good flexibility while suppressing curling, and thus could be used as a flexible window film.

Conversely, as shown in Table 3, each of the flexible window films of Comparative Examples, including the epoxy group-containing siloxane resin and free from the crosslinking agent according to the present invention, exhibited poor properties in terms of pencil hardness and curling.

It should be understood that various modifications, changes, alterations, and equivalent embodiments can be made by those skilled in the art without departing from the spirit and scope of the invention.

The invention claimed is:

1. A composition for window films, comprising: a cross-linking agent represented by any one of Formulae 1-3, and 1-5 to 1-7; an epoxy group-containing siloxane resin represented by Formula 2-2; and an initiator,

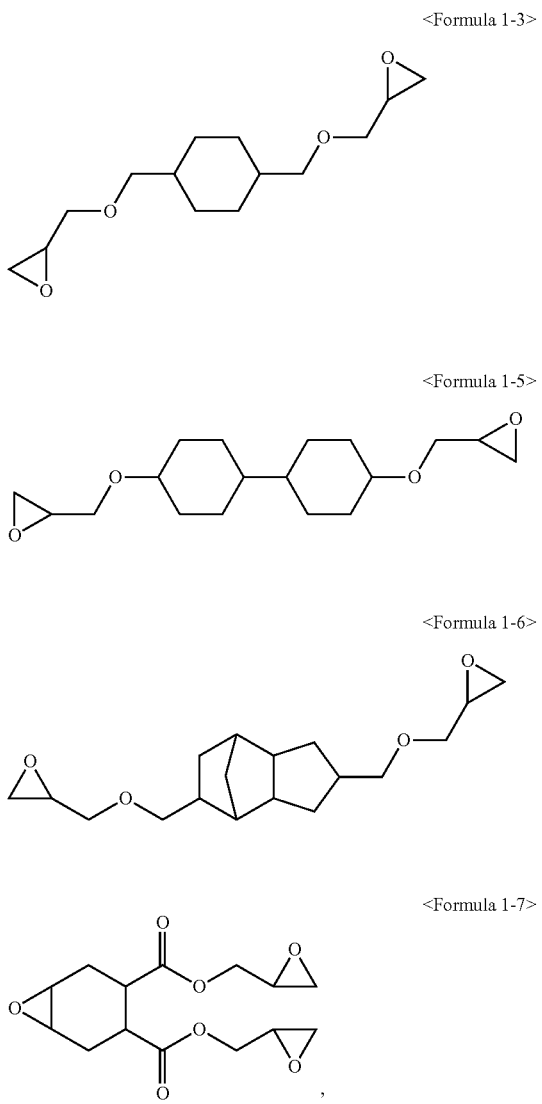

<Formula 1-3>

<Formula 1-5>

<Formula 1-6>

<Formula 1-7>

$(R^1SiO_{3/2})_x(R^3R^4SiO_{2/2})_z$  <Formula 2-2> where in Formula 2-2, $R^1$ is an epoxy group;
$R^3$ and $R^4$ are each independently an expoxy group, a hydrogen atom, a substituted or unsubstituted $C_1$ to $C_{20}$ alkyl group, a substituted or unsubstituted $C_2$ to $C_{20}$ alkenyl group, a substituted or unsubstituted $C_2$ to $C_{20}$ alkynyl group, a substituted or unsubstituted $C_3$ to $C_{20}$ cycloalkyl group, a substituted or unsubstituted $C_6$ to $C_{20}$ aryl group, a substituted or unsubstituted $C_7$ to $C_{20}$ arylalkyl group, a substituted or unsubstituted $C_6$ to $C_{20}$ hetero-aryl group, or a substituted or unsubstituted $C_7$ to $C_{20}$ hetero-arylalkyl group; and
$0<x<1$, $0<z<1$, and $x+z=1$).

2. The composition for window films according to claim 1, wherein the epoxy group-containing siloxane resin is represented by any one of Formula 2-2A to Formula 2-2F:

$(EcSiO_{3/2})_x((Me)_2SiO_{2/2})_z$      <Formula 2-2A>

$(EcSiO_{3/2})_x((Et)_2SiO_{2/2})_z$      <Formula 2-2B>

$(EcSiO_{3/2})_x(MeEtSiO_{2/2})_z$      <Formula 2-2C>

$(GpSiO_{3/2})_x((Me)_2SiO_{2/2})_z$      <Formula 2-2D>

$(GpSiO_{3/2})_x((Et)_2SiO_{2/2})_z$      <Formula 2-2E>

$(GpSiO_{3/2})_x(MeEtSiO_{2/2})_z$      <Formula 2-2F> where in Formula 2-2A to Formula 2-2F, Ec is a (3,4-epoxycyclohexyl)ethyl group, Gp is a 3-glycidoxy propyl group, Me is a methyl group, Et is an ethyl group, $0<x<1$, $0<z<1$, and $x+z=1$.

3. A flexible window film comprising a base layer and a coating layer formed on one surface of the base layer, wherein the coating layer is formed of the composition for window films according to claim 1.

4. The flexible window film according to claim 3, further comprising: an adhesive layer formed on the other surface of the base layer.

5. A flexible display comprising the flexible window film according to claim 3.

6. The flexible display according to claim 5, comprising: a display part; an adhesive layer formed on the display part; a polarizing plate formed on the adhesive layer; a touchscreen panel formed on the polarizing plate; and the flexible window film formed on the touchscreen panel.

7. The flexible display according to claim 5, comprising: a display part; a touchscreen panel formed on the display part; a polarizing plate formed on the touchscreen panel; and the flexible window film formed on the polarizing plate.

8. The flexible display according to claim 5, comprising: a display part; an adhesive layer formed on the display part; and the flexible window film formed on the adhesive layer.

9. The flexible display according to claim 8, further comprising: a polarizing plate disposed at an upper or lower side of the display part.

* * * * *